United States Patent Office 3,439,071
Patented Apr. 15, 1969

3,439,071
METHOD FOR DEODORIZING O,O-DIALKYL S-(ALKYLTHIO)ALKYL PHOSPHORODITHIOATES
Alfred Finlay Marks, Trenton, and Armin Wolfgang Brahm, Robbinsville, N.J., assignors to American Cyanamid Company, Stamford, Conn., a corporation of Maine
No Drawing. Filed June 30, 1966, Ser. No. 561,699
Int. Cl. C07f 9/16; A01n 9/36
U.S. Cl. 260—989                1 Claim

ABSTRACT OF THE DISCLOSURE

A method for deodorizing mercaptan-containing, organic dithiophosphates. The organic dithiophosphates are pesticides.

This invention relates to an improved process for deodorizing malodorous mercaptan-containing, organic dithiophosphate compositions. More particularly, the invention is concerned with an improved process for eliminating offensive odors from and stabilizing the same in dithiophosphate pesticides having the formula:

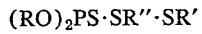

wherein R and R' each represents the same or different alkyl substituent containing from 1 to 4 carbon atoms and R'' stands for a lower alkylene bridge.

Several attractive processes for the effective removal of objectionable odors from certain of the thiophosphate pesticides have been developed in the recent past. Unfortunately, not all such processes are effective for the treatment of all thiophosphates. For instance, an ozonization process for reducing objectionable odors of dithiophosphates as disclosed in United States Letters Patent No. 2,980,723, issued on Apr. 18, 1961, is not wholly satisfactory for treatment of O,O-dialkyl S-(alkylthio) alkyl dithiophosphates. This is because ozonization appears to cause rapid degradation of such dithiophosphates. Another known procedure for effecting the deodorization of dialkyl thiophosphates of a mercaptosuccinate which involves treatment with an organic copper complex is disclosed in British Patent No. 960,013. The latter teaches that if deodorization is to be effective the presence of an oxygen donor is required. The donor may be incorporated into the pesticides either as atmospheric oxygen or as a ketonic peroxide, such as dimethyl ketone peroxide or methyl ethyl ketone peroxide. Further, other pesticides, such as diethyl p-chlorophenylthiomethyl dithiophosphate and diethyl p-nitrophenol thiophosphate can be similarly treated by the British procedure. However, when the process of the British patent is applied to pesticidal dithiophosphates of the formula:

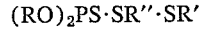

wherein R, R' and R'' are as defined hereinabove, the process does not provide a wholly satisfactory method for deodorizing such compounds, since strong oxidizing agents tend to degrade them.

It is, therefore, a principal object of the invention to provide a process for effecting removal of objectionable odors from O,O-dialkyl S-(alkylthio)alkyl dithiophosphates. It is also an object of the invention to provide a process for stabilizing the latter odorwise over a prolonged period of time. Other objects and advantages will become apparent from a consideration of the following description.

To this end, it has been found that these objects can be unexpectedly attained by providing for a series of critical operations, thereby overcoming degradation and instability. These involve the practice of three essential steps which comprise:

(1) Treating an O,O-dialkyl S-(alkylthio)alkyl dithiophosphate with between about 1.5% and 4.0% by weight of either an organic or inorganic peroxide or an organic or inorganic hydroperoxide;

(2) Heating the mixture of a temperature between about 70° C. and 90° C., usually for from about 15 minutes to about 20 hours and, preferably, from about 20 minutes to about 45 minutes; and (3) Admixing with the treated mixture between about 0.75% and 5% by weight of an aliphatic or aromatic aldehyde.

Failure to observe the foregoing sequential operations does not result in enhanced deodorization and stabilization of certain dithiophosphates.

Exemplary dithiophosphates which may be deodorized by treatment in accordance with the invention are: O,O-diethyl S-(ethylthio) methyl phosphorodithioate, O,O-dimethyl S-(ethylthio) methyl phosphorodithioate, O,O-dimethyl S-2-(ethylthio) ethyl phosphorodithioate, O,O-diethyl S-(ethylthio) ethyl phosphorodithioate.

Illustrative of the organic or organic peroxides and hydroperoxides useful in the process of the invention are: cumene hydroperoxide, cumene peroxide, hydrogen peroxide, benzol peroxide, t-butyl hydroperoxide, potassium peroxide, pinene hydroperoxide and the like, of which cumene hydroperoxide is preferred.

As illustrative of aldehydes amenable to use in the process of the invention are: methylprotocatechuic aldehyde, ethylprotocatechuic aldehyde, ethyl glyoxylate, benzaldehyde and salicylaldehyde. The preferred aldehyde is methylprotocatechuic aldehyde.

For optimum results, the malodorous dithiophosphate is treated with sufficient organic or inorganic peroxide or hydroperoxide to react with all of the odor producing impurities present therein. In general, from about 1.75% to 3% by weight of the peroxide of hydroperoxide is adequate for this treatment. Subsequent to peroxide or hydroperoxide addition, the mixture is heated, preferably, to about 75° C. to 85° C. for between about 30 and 45 minutes. The mixture is then treated with between about 0.75% and 3% by weight of the aldehyde, preferably methylprotocatechuic aldehyde. The aldehyde treatment is preferably carried out at a temperature between about 50° C. and 85° C.

The following examples will further illustrate the criticality of the sequential steps set forth above. Unless otherwise stated, the percentages are by weight.

EXAMPLE 1

To determine the various effects of the deodorizing and stabilization treatments on technical grade, O,O-diethyl S-(ethylthio) methyl photophorodithioate, hereinafter known as T.G., five separate samples of T.G. are subjected to the following comparative procedures:

(1) T.G. is admixed with 3% cumene hydroperoxide and the mixture heated to 90° C. for 30 minutes;

(2) T.G. is admixed with 1% methylprotocatechuic maleate at room temperature;

(3) 3% cumene hydroperoxide is admixed with T.G. and the mixture heated to 90° C. for 30 minutes. The mixture is cooled to from about 50° C. to 80° C. To the cooled mixture is added 1% methylprotocatechuic aldehyde;

(4) T.G. is admixed with 1% of ozonized diethylmaleate at room temperature;

(5) T.G. and 0.5% of 2,4-pentanedione copper complex are admixed at room temperature. Resulting mixture is then treated with 1% of methyl ethyl ketone peroxide; and (6) T.G., untreated, as the control sample.

The treated T.G. as well as the untreated T.G. are each sprayed individually on 24/48 mesh granular attapulgite previously treated with 4% of diethylene glycol as a deactivator. The individual preparations are thoroughly mixed to assure uniform distribution of the toxicant on the particles. The formulations are then placed in sealed containers and stored at room temperature for twelve weeks.

After storage, the T.G. samples are evaluated by the known Scheffe's method of paired comparisons. Sixty judges are employed and each sample is compared with every other sample in the test. To eliminate a possible bias due to the desensitization of the olfactory nerves by the first sample proffered, thereby causing a preference for the second, both orders of presentation for each sample pair are obtained for evaluation.

In order to determine the relative preference of N samples, each sample is compared with each of the other (N-1) samples, with both orders of presentation for each pair of samples, the number of permutations for N samples two at active, is therefore N(N-1). Preferences are scored on an arbitary numerical scale, ±2 for a high performance, -2 for a strong rejection and 0 for no preference. If preference is not strong, the samples are scored ±1. The sign of the score depends upon wherether the preference is for the first or second sample proffered. The preferred sample received a positive score when it is proffered first and a negative score when proffered second. In the absence of a desensitization effect, and random or systematic error, the sum of the scores for both orders of presentation for each sample pair would be zero.

A scoring box is made up with the row scores pertaining to the preference of samples proffered first and column scores pertaining to the preference of samples proffered second. The total score for each sample is obtained by making a sign change when adding the column scores to the row socres. After the rows and colmuns are summed, and allowing for the necessary sign changes, the sample with the highest positive score will be the most preferred and the other samples can be ranked in descending order. The results of the above tests are provided in Table I below where it is shown that the O,O-diethyl S-(ethylthio) methyl phosphorodithioate treated in accordance with the invention is rated vastly superior odorwise to all other treatments.

TABLE I

| Type of treatment of O,O-diethyl S-(ethylthio) methyl phosphorodithioate | Main Effect Parameter* $\alpha_6$ Initial | After 12 Weeks |
|---|---|---|
| 3% cumene hydroperoxide | +0.208 | |
| 1% methylprotocatechuic aldehyde | -0.417 | |
| 3% cumene hydroperoxide+1% methylprotocatechuic aldehyde | +0.958 | No significant change from the initial evaluation. |
| 1% ozonized diethylmaleate | +0.167 | |
| 0.5% 2,4-pentanedione copper complex+1% methyl ethyl ketone peroxide | -0.167 | |
| Control (untreated technical material) | -0.750 | |

*Total number of treatments compared: m=6.
Total number of judges for each pair: 2r=4 (r judges for each order of permutation).
Total number of permutations: 2M=m(m-1)=30.
Highest possible $\alpha_6$ value=+1.667.
-=Rejected (mean average of preference judged against all samples).
+=Accepted.

EXAMPLE 2

In the following tests separate samples of O,O-diethyl S-(ethylthio) methyl phosphorodithioate are treated in the manner described in Example 1, except that the prepared samples are stored as liquids rather than being applied to a granular solid. The treated samples are placed in sealed containers and stored at room temperature for one month. They are then presented to judges for the odor preference and evaluated by the Scheffe's method of paired comparisons. The data obtained are provided in Table II below. Clearly, a strong preference for the sample prepared by the process of the invention is shown.

The data also show a need for a treatment which provides sustained odor control. It can be seen, however, that initial treatment with 3% cumene hydroperoxide produces good odor control, but that after one month storage, the odor control achieved by the process of the invention is found to be substantially better.

TABLE II

| Type of Treatment | Type of Formulation Evaluated ** | Main Effect Parameter* $\alpha_6$ Initial | One month, 25° C. |
|---|---|---|---|
| 3% cumene hydroperoxide, 30 mins. at 90° C. | O,O-diethyl S-(ethylthio) methyl phosphorodithioate. | +1.042△ | +0.792△ |
| 1% methylprotocatechuic aldehyde, room temperature. | do | -0.292 | -0.292 |
| [3% cumene hydroperoxide+1% methylprotocatechuic aldehyde,] 30 mins. at 90° C. | do | +0.792△ | +1.250△ |
| 1% ozonized diethylmaleate, room temperature. | do | -0.042 | -0.209 |
| [0.5% 2,4-pentanedione copper complex+1% methyl ethyl ketone peroxide,] room temperature. | do | -0.416 | -0.508 |
| Control (untreated technical material). | do | -1.083 | -1.041 |

*Total number of treatments compared: m=6.
Total number of judges for each pair: 2r=4 (r judges for each order of permutation).
Total number of permutations: 2M=m(m-1)=30.
Highest possible $\alpha_6$ value=+1.667.
**Main effect parameters calculated from tests using emulsifiable concentrate 47.5% of some toxicant, 39% xylene and 10% of an emulsifier showed the same general magnitude.
△Denotes significant odor improvement.

EXAMPLE 3

In the following tests separate samples of O,O-diethyl S-(ethylthio) methyl phosphorodithioate are treated with 1%, 1.5%, 2.0% or 3.0% by weight of cumene hydroperoxide. These samples are heated to 80° C. or 90° C. for 30 minutes and cooled to between 60° C. and 80° C. and 1% by weight of methylprotocatechuic aldehyde is added to each sample treated. Separate portions of attapulgite granular 24/48 mesh are then treated with 10% by weight of toxicant from the above preparations and the thus prepared granulars placed in individual sealed containers for storage and evaluation. Portions of each of the prepared materials are also stored as liquids in separate sealed containers. After one month storage at room temperature, all preparations are evaluated by the Scheffe's method of paired comparisons. The results provided in the table below establish the lowest effective concentration of peroxide at the 1.5% level of the dithiophosphate treated.

of xylene and 10% by weight of a mixture of an alkyl aryl polyether alcohol and a calcium alkyl aryl sulfonate. Two milliliters of each formulation are mixed with 98 mililiters of water and the thus prepared samples are evaluated by Scheffe's method of paired comparisons and the results are provided in Table IV below. The data clearly establishes the necessity of heating the peroxide treated toxicant to a temperature above 60° C.

TABLE IV

| Treatment | Time | Temperature, °C. | Type of Formulation Tested | Main Effect Parameter* $\alpha_3$ |
|---|---|---|---|---|
| Control | 30 mins | 90 | O,O-diethyl S-(ethylthio) methyl phosphorodithioate (emulsifiable concentrate). | −0.833 |
| 3% CHP | 16 hours | 60 | do | −0.167 |
| 3% CHP | 30 mins | 90 | do | +1.000ᴬ |

*Total number of treatments compared: m=3.
Total number of judges for each pair: 2r=4 (r=2 for each order of permutation).
Total number of permutations: 2M=m(m−1)=6.
Highest possible $\alpha_3$ value=+1.333.
ᴬDenotes significant odor improvement.
CHP=Cumene hydroperoxide.

EXAMPLE 5

To determine the effect of peroxide concentration in treatment of dithiophosphates, replicate samples of O,O-

TABLE III

| Treatment | | | Type of Formulation Tested | Main Effect Parameter* $\alpha_4$ |
|---|---|---|---|---|
| CHP+ Level, Percent | Methylprotocatechuic aldehyde Level, Percent | Reaction, Temperature and Time | | |
| 3 | 1 | 30 min./90° C | Attapulgite granular 24/48 mesh +10% w./w. toxicant. | +0.2500 |
| 2 | 1 | 30 min./80° C | do | +0.2500 |
| 1.5 | 1 | 30 min./80° C | do | +0.1250 |
| 1.0 | 1 | 30 min./80° C | do | −0.6250 |
| 3 | 1 | 30 min./90° C | Technical O,O-diethyl S-(ethylthio) methyl phosphorodithioate. | +0.2500 |
| 2 | 1 | 30 min./80° C | do | +0.3750 |
| 1.5 | 1 | 30 min./80° C | do | +0.0000 |
| 1.0 | 1 | 30 min./80° C | do | −0.6250 |

*Total number of treatments: m=4.
Total number of judges for each pair: 2r=4 (2 judges for each order of permutation).
Total number of permutations: 2M=m(m−1)=12.
Highest possible $\alpha_4$ value = +1.5000.
+CHP=Cumene hydroperoxide.

EXAMPLE 4

To determine the effect of time and temperature on the process of the instant invention, separate samples of technical O,O-diethyl S-(ethylthio) methyl phosphorodithioate are (1) heated to 90° C. for 30 minutes; (2) treated with 3% by weight of cumene hydroperoxide and heated to 60° C. for 16 hours; (3) treated with 3% cumene hydroperoxide and heated to 90° C. for 30 minutes. These samples are then formulated as emulsifiable concentrates containing 48% by weight of O,O-diethyl S-(ethylthio) methyl phosphorodithioate, 39% by weight diethyl S-(ethylthio) methyl phosphorodithioate emulsifiable concentrate are treated with 1%, 2% or 3% of cumene hydroperoxide and heated to 90° C. for 30 minutes. The samples are then formulated as emulsifiable concentrates as described in Example 4, placed in sealed containers and stored at room temperature for one month, then evaluated in accordance with Scheffe's method of paired comparisons. The results which appear in Table V below stronly indicate the need for treatment of the dithiophosphate with more than about 1% by weight of the peroxide.

TABLE V

| Replicates | CHP Level | Treatment | Type of Formulation Tested** | Main Effect Parameter* $\alpha_4$ | |
|---|---|---|---|---|---|
| | | | | A | B¹ |
| 1 2 3 | 1% CHP | 90° C./30 min | O,O-diethyl S-(ethylthio) methyl phosphorodithioate (emulsifiable concentrate). | +0.187 −0.062 +0.000 | +0.042 |
| 1 2 3 | 2% CHP | 90° C./30 min | do | +0.312 +0.312 +0.438 | +0.313 |
| 1 2 3 | 3% CHP | 90° C./30 min | do | +0.625 +0.688 +0.375 | +0.604 |
| 1 2 3 | Control untreated | | do | −1.125 −0.928 −0.813 | −0.958 |

¹ Average for 3 replicates.
*Total number of treatments compared: 3m=12(m=4).
Total number of judges: 3×2r=12 (6 for each order of permutation).
Total number of permutations: 3×2M=m(m−1)=36.
Highest possible $\alpha_4$ value=+1.500.
**2 ml. O,O-diethyl S-(ethylthio) methyl phosphorodithioate emulsifiable concentrate+98 ml. tap water.
A=$\alpha$ values for each treatment series (each material judged by 4 different judges).
B=$\alpha$ values cumulative for all treatments (each material judged by 12 different judges).
CHP=Cumene hydroperoxide.

EXAMPLE 6

O,O-diethyl S-(ethylthio) methyl phosphorodithioate is treated with 3%, by weight, of cumene hydroperoxide, then heated to 90° C. for 30 minutes, and cooled to 60° C. Separate samples from the so-treated phosphorodithioate are treated with 0.50%, 0.75% or 1.0%, by weight, of methylprotocatechuic aldehyde. Twelve percent, by weight, of each preparation is sprayed on individual samples of 24/48 mesh granular attapulgite, which has been previously deactivated with 4% of diethylene glycol. The formulations are then stored at room temperature for one month and evaluated by Scheffe's method of paired comparisons. The results in Table VI below clearly establish the need for addition of about 1% by weight of the aldehyde to the peroxide treated toxicant.

TABLE VI

| Treatment | Type of Formulation tested | Main Effect Parameter* $\alpha_1$ |
|---|---|---|
| 3% CHP (90°/30 min.) +1% methylprotocatechuic aldehyde. | O,O-diethyl S-(ethylthio) methyl phosphorodithioate. | +0.688 |
| 3% CHP (90°/30 min.) +0.75% methylprotocatechuic aldehyde. | -----do----- | +0.312 |
| 3% CHP (90°/30 min.) +0.50% methylprotocatechuic aldehyde. | -----do----- | −0.062 |
| Untreated control | -----do----- | −0.938 |

*Total number of treatments: m=4.
Total number of judges for each pair: 2r=4 (2 judges in each order of permutations).
Total number of permutations: 2M=m(m−1)=12.
Highest possible $\alpha$ value=+1.500.
CHP=Cumene hydroperoxide.

EXAMPLE 7

Following the procedures employed in Example 4 for sample preparation and evaluation but altering the heating temperature to 70° C., 80° C. and 90° C. and limiting the heating period to 20 minutes, there is established in three samples the desirability of heating the treated toxicant to at least about 80° C. for 20 minutes. The results are tabularized in Table VII below.

TABLE VII

| Treatment | Time, mins. | Temperature, degrees | Tested As— | Main Effect Parameter* $\alpha_3$ |
|---|---|---|---|---|
| 3% CHP | 20 | 70 | O,O-diethyl S-(ethylthio) methyl phosphorodithioate. | −0.667ΔΔ |
| 3% CHP | 20 | 80 | -----do----- | +0.167Δ |
| 3% CHP | 20 | 90 | -----do----- | +0.500Δ |

*Total number of treatments compared: m=3.
Total number of judges for each pair: 2r=4 (r=2 for each order of permutation).
Total number of permutations 2M=m(m−1)=6.
Highest possible $\alpha_3$ value =+1.333.
ΔDenotes significant odor improvement.
ΔΔDenotes that this treatment is significantly worse than the two other samples.
CHP=Cumene hydroperoxide.

We claim:

1. A method for removing objectionable odors from O,O-diethyl S-(ethylthio) methyl phosphorodithioate comprising the sequential steps of: treating said phosphorodithioate with between about 1.5% and about 4% by weight of cumene hydroperoxide, heating the treated mixture to a temperature between about 75° C. and about 90° C. and from twenty to forty-five minutes, and admixing therewith from 1% to about 3% by weight of methylphotocatechuic aldehyde with the temperature of said mixture maintained at between about 50° C. and 85° C.

No references cited.

CHARLES B. PARKER, *Primary Examiner.*

A. H. SUTTO, *Assistant Examiner.*

U.S. Cl. X.R.

260—948, 990; 424—215